United States Patent
Kamiya

(10) Patent No.: US 9,235,778 B2
(45) Date of Patent: Jan. 12, 2016

(54) HUMAN DETECTION APPARATUS

(71) Applicant: DENSO CORPORATION, Kariya, Aichi-pref. (JP)

(72) Inventor: Yasunori Kamiya, Toyota (JP)

(73) Assignee: DENSO CORPORATION, Kariya (TW)

( * ) Notice: Subject to any disclaimer, the term of this patent is extended or adjusted under 35 U.S.C. 154(b) by 0 days.

(21) Appl. No.: 14/399,699

(22) PCT Filed: May 13, 2013

(86) PCT No.: PCT/JP2013/003036
§ 371 (c)(1),
(2) Date: Nov. 7, 2014

(87) PCT Pub. No.: WO2013/179588
PCT Pub. Date: Dec. 5, 2013

(65) Prior Publication Data
US 2015/0117773 A1    Apr. 30, 2015

(30) Foreign Application Priority Data

May 31, 2012   (JP) ................................ 2012-124537

(51) Int. Cl.
G06K 9/00       (2006.01)
G06K 9/46       (2006.01)

(52) U.S. Cl.
CPC .......... G06K 9/4652 (2013.01); G06K 9/00362 (2013.01); G06K 9/00805 (2013.01); G06K 9/46 (2013.01)

(58) Field of Classification Search
USPC ................... 382/103, 104, 153, 165; 348/113
See application file for complete search history.

(56) References Cited

U.S. PATENT DOCUMENTS

| 2009/0082174 A1 | 3/2009 | Ikeda et al. |
| 2009/0082931 A1 | 3/2009 | Ikeda et al. |
| 2009/0082933 A1 | 3/2009 | Ikeda et al. |

FOREIGN PATENT DOCUMENTS

| JP | H07-65149 A   | 3/1995 |
| JP | 2001-331788 A | 11/2001 |
| JP | 2006-99611 A  | 4/2006 |
| JP | 2008-242571 A | 10/2008 |
| JP | 2010-79716 A  | 4/2010 |

OTHER PUBLICATIONS

International Search Report and Written Opinion of the International Searching Authority dated Jul. 30, 2013 in the corresponding PCT application No. PCT/JP2013/003036 (and English translation).

*Primary Examiner* — Duy M Dang
(74) *Attorney, Agent, or Firm* — Posz Law Group, PLC

(57) ABSTRACT

The knowledge that "the color of a vehicle body or guard rail is uniform" applies to the detection of a human, improving the detection performance of the human of which a part of the body is hidden. That is, it is determined whether or not a human candidate area specified based on the ordinary human recognition model has a specific part, e.g., an area corresponding to a lower body, exhibiting the high degree of color uniformity. When affirmed, the human candidate area is understood to be "a human of which a part of the body is hidden by a hood or a trunk" and recognized as a human, same as in the case where the body is not hidden.

7 Claims, 4 Drawing Sheets

HUMAN DETECTION APPARATUS

CROSS REFERENCE TO RELATED APPLICATION

This present disclosure is a U.S. national stage application of PCT/JP2013/003036 filed on May 13, 2013 and is based on Japanese Patent Application No. 2012-124537 filed on May 31, 2012, the disclosures of which are incorporated herein by reference.

TECHNICAL FIELD

The present disclosure is related to a human detection apparatus that detects a human from an input image using pattern recognition.

BACKGROUND ART

The technology of detecting a human existing in front of or behind a vehicle employs a conventionally known technology of detecting a human in an input image by performing pattern recognition, for example. The pattern recognition uses a recognition model to recognize a human in an image (input image) picked up with a camera, etc.

For example, Patent Literature 1 discloses a technology to detect a pedestrian by verifying an image picked up by an image pickup unit against template data (a recognition model) for pedestrian detection, and to determine a shielding object existing between the detected pedestrian and the host vehicle.

PRIOR ART LITERATURES

Patent Literature

Patent Literature 1: JP 2010-79716 A

SUMMARY OF INVENTION

By the way, in the pattern recognition of the conventional technology using a human recognition model, when a part of the human body (for example, the lower body) is hidden by a shielding object, such as a hood and a trunk of a vehicle, or a guard rail, the human image of the input image will be in disagreement with the recognition model; accordingly the recognition rate will deteriorate. To the input image in which a human lower body is hidden by a hood of a vehicle, etc. as described above, it is thinkable that the pattern recognition is performed using a recognition model to detect only the part corresponding to a human upper body. However, even if the degree of agreement of the image area corresponding to the upper body with the model is high, the robustness in the recognition result deteriorates because the pattern recognition is performed only for the half of the estimated human image area.

It is an object of the present disclosure to provide a technology to improve the recognition rate of a human by pattern recognition under the condition that a part of a human body is hidden by a shielding object, such as a vehicle body.

An aspect of the present disclosure made for the above object is related to a human detection apparatus which detects a human by pattern recognition from an input image picked up by an image pickup unit. The human detection apparatus according to the aspect is characterized by including a specification section, a color determination section, and a human detection section.

The specification section specifies a candidate area from the input image using a recognition model to recognize a human: the candidate area is estimated to be a human. The color determination section determines a degree of color uniformity in the input image. The human determination section determines whether an image area including the candidate area is a human based on a positional relationship between the candidate area specified by the specification section and an image part: the image part provides the degree of color uniformity determined by the color determination section that satisfies a prescribed requirement.

The gist of this aspect is to maintain the detection performance of a human of which a part of the body is hidden, by introducing to the human detection the knowledge that "the color of a vehicle body or guard rail is uniform." That is, in a case where a candidate area to be estimated as a human and an image part with a high degree of color uniformity in an input image are in a specific positional relationship, it is understood that the case corresponds to "a human of which a part of the body is hidden by a hood, a trunk, a guard rail, etc.", and the candidate is recognized as a human, same as in the case where the body is not hidden. Even if the credibility of the candidate area estimated on the basis of a human recognition model is somewhat low, it is possible to complement the information used as the ground for recognizing a human by the determination result of the degree of color uniformity. According to such a scheme, it is possible to improve the human recognition rate even in cases where a part of the human body is hidden by a hood, a trunk, a guard rail, etc.

BRIEF DESCRIPTION OF DRAWINGS

The above and other objects, features and advantages of the present disclosure will become more apparent from the following detailed description made with reference to the accompanying drawings. In the drawings.

EMBODIMENTS FOR CARRYING OUT INVENTION

Hereinafter, an embodiment of the present disclosure will be explained with reference to the accompanying drawings. The present disclosure is not restricted to the following embodiment at all, and it can be implemented in various manners.

In the present application, "information" is used not only as an uncountable noun but also as a countable noun.

<Explanation of Configuration of Human Detection System>

Figure 1:
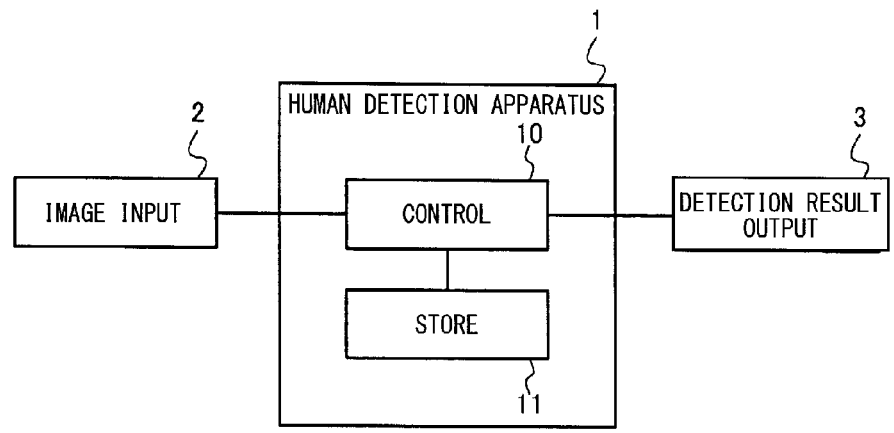
FIG. 1 is a block diagram illustrating outline structure of a human detection system.

A human detection system according to an embodiment is mounted in a vehicle, etc. and employed to detect a human existing ahead of the vehicle. As illustrated in FIG. 1, the human detection system is configured with a human detection apparatus 1, an image input unit 2, and a detection result output unit 3. The image input unit 2, detection result output unit 3, and the like are coupled to the human detection apparatus 1.

The human detection apparatus 1 is an image processor which detects a human image out of an input image by pattern recognition using a recognition model for recognizing a human. The human detection apparatus 1 includes a control circuit 10 and a storage portion 11.

The control circuit 10 is configured with well-known information processing equipment or a computer, provided with a CPU, a ROM, a RAM, an input/output interface, etc. (not shown). The control circuit 10 processes an input image supplied from the image input unit 2 and outputs a human detection result. The control circuit 10 detects the image of a human in the input image by the well-known technique of the pattern recognition using a human recognition model.

Here, in the present application, several kinds of processing or procedure performed by the control circuit 10 (that is, CPU) are configured as several sections included in the control circuit 10. Each section can be divided into several sections, and, on the contrary, several sections can be combined into one section. Each section configured in this way can be referred to as a device, a module, or a means. For example, it can be said that the control circuit 10 functions as a specification section, a color determination section, a human determination section, and a human model creation section. The details will be described later.

Figure 2:
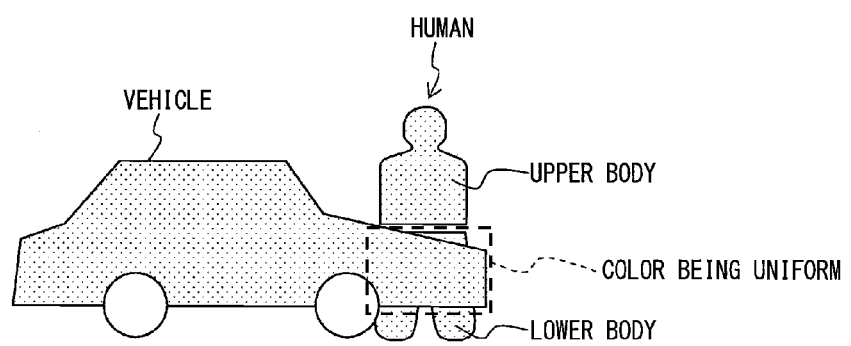
FIG. 2 is an explanatory diagram illustrating an example of an image of a human of which a part of the body is hidden.

At this time, as illustrated in FIG. 2, when a part of the body (the lower body in the case of FIG. 2) of a human in an input image is hidden by a part of a vehicle or the like, even if the image area of the lower body is not in agreement with a recognition model, but if the degree of color uniformity of the area is high, the image area is recognized as a human, same as in the case where the lower body is not hidden. That is, according to the characteristic technique of the present disclosure, by utilizing the knowledge that "the color of a vehicle body or guard rail is uniform", when the degree of color uniformity of the partial area of a human body is high, the partial area is recognized as "a human of which a part of the body is hidden by a hood, a trunk, etc." A still more detailed detecting method will be described later.

The storage portion 11 stores the data of a human recognition model employed for the pattern recognition, the data related to the degree of color uniformity of an image for recognizing as a shielding object which hides a human, and other data.

The image input unit 2 is configured with an in-vehicle camera to pick up the front of a vehicle, and others. The image input unit 2 is also referred to as an image pickup unit. The image picked up by the image input unit 2 is supplied to the control circuit 10 of the human detection apparatus 1 as an input image. The detection result output unit 3 is an in-vehicle apparatus. The in-vehicle apparatus performs vehicle control or presents to a driver an alarm notifying that there is present a human, depending on the detection result of a human by the human detection apparatus 1. An example of the in-vehicle apparatus is a control apparatus or the like of a travel safety system or a driving support system of a vehicle.

First Embodiment

The procedure of human detecting in a first embodiment performed by the control circuit 10 of the human detection apparatus 1 is explained with reference to FIG. 3.

(1) The input image supplied from the image input unit 2 is scanned using a recognition model of a human (refer to FIG. 3a), and the degree of agreement (a human likeness score) with the recognition model is calculated at each position of the input image. Then, a position at which the human likeness score takes a local maximum in the input image is listed. That is, the "human likeness score" indicates the degree of identity with a human.

Figure 3:
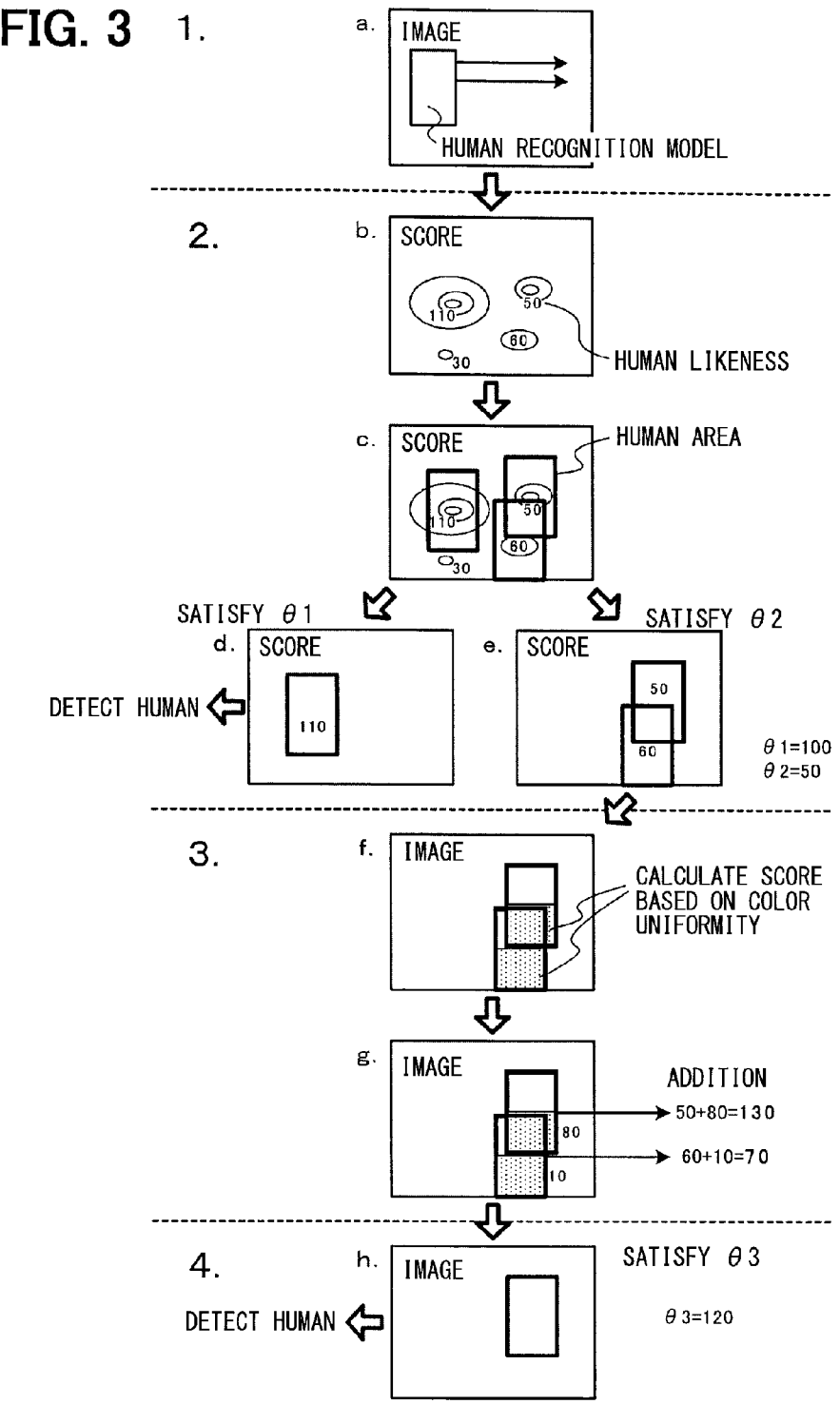
FIG. 3 is an explanatory diagram illustrating the procedure of the processing in a first embodiment.

(2) FIG. 3b is a schematic map illustrating contour lines expressing the distribution of the human likeness score calculated in (1). Here, a human candidate is extracted out of the local maxima of the human likeness score using two thresholds $\theta 1$ and $\theta 2$ ($\theta 1 > \theta 2$). When exceeding the threshold $\theta 1$, the image area is determined to be a human, only by the result of the pattern recognition in (1). When exceeding the threshold $\theta 2$ but not the threshold $\theta 1$, the image area is determined to be a human candidate with high possibility of being a human of which a part of the body is hidden. It is assumed that the threshold $\theta 1 = 100$ and the threshold $\theta 2 = 50$ in the case illustrated in FIG. 3.

FIG. 3c expresses schematically a state where a frame of a human area is superimposed on the position of a human candidate where the local maximum satisfies the threshold $\theta 1$ or $\theta 2$, on the map of the human likeness score. When the human likeness score (score 110) satisfies the threshold $\theta 1$, the area corresponding to the human candidate is recognized to be a human as the recognition result by the ordinary pattern recognition, and the detection result is outputted (refer to FIG. 3d). In contrast, when the human likeness score (scores 50 and 60) does not satisfy the threshold $\theta 1$ but satisfies the threshold $\theta 2$, the degree of color uniformity is further determined to the human candidate (refer to FIG. 3e). It can be said that the control circuit 10 functions as the human specification section.

(3) As for the position of the human candidate which has not satisfied the threshold $\theta 1$ but has satisfied the threshold $\theta 2$ in (2), the degree of color uniformity of the image in the area corresponding to the lower body of the human area (refer to FIG. 3f) is calculated, and a score corresponding to the degree of color uniformity is calculated. It can be said that the control circuit 10 functions as a color determination section which determines the degree of color uniformity. The score corresponding to the degree of color uniformity becomes higher as the degree of color uniformity in the area of the lower body is higher. Then, as illustrated in FIG. 3g, the score corresponding to the degree of color uniformity is added to the human likeness score of the corresponding human candidate.

(4) It is determined in (3) whether the sum total score of the score corresponding to the degree of color uniformity plus the human likeness score satisfies a threshold $\theta 3$. The threshold $\theta 3$ determines that the human candidate is a human of which the lower body is hidden, as a result of reflecting the determination of the degree of color uniformity of the lower body. It is assumed that the threshold $\theta 3 = 120$ in the case illustrated in FIG. 3. As illustrated in FIG. 3h, when the sum total score (the sum total score 130) of the human likeness score plus the score corresponding to the degree of color uniformity satisfies the threshold $\theta 3$, the area corresponding to the human candidate is recognized to be a human, and the detection result is outputted. It can be said that the control circuit 10 functions as a human determination section which determines whether an image area is a human.

Effect of First Embodiment

The degree of color uniformity is determined to the image of the lower area (corresponding to the lower body) of a human candidate including the portion of which the human likeness score calculated using the ordinary human recognition model does not satisfy the threshold $\theta 1$ but satisfies the threshold $\theta 2$. Then, when the sum total score of the score corresponding to the degree of color uniformity in the lower area concerned plus the human likeness score in the human candidate concerned is greater than a specified value, the area of the human candidate concerned is determined to be a human. According to such procedure, it is possible to improve the recognition rate to a human of which a part of the body is hidden, such a human having been difficult to be detected only by the ordinary human recognition model.

Second Embodiment

Figure 4:
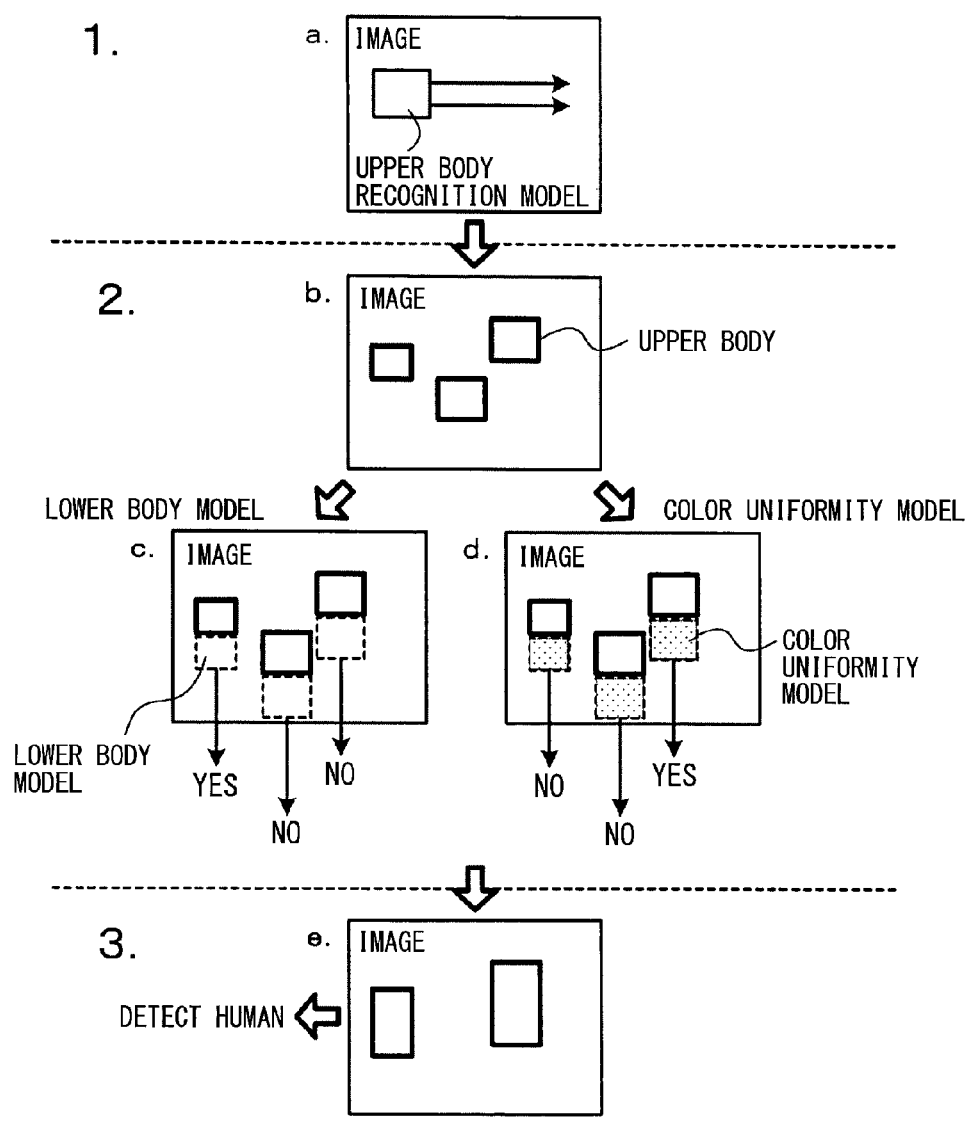
FIG. 4 is an explanatory diagram illustrating the procedure of the processing in a second embodiment.

The procedure of human detecting in a second embodiment performed by the control circuit 10 of the human detection apparatus 1 is explained with reference to FIG. 4.

(0) As premise of processing, the following recognition models are prepared in the storage portion 11: a recognition model to recognize a human upper body (hereinafter, an upper body model); a recognition model to recognize a human lower body (hereinafter, a lower body model); and a recognition model to determine the color uniformity of a shielding object which hides a human lower body (hereinafter, a color uniform model). The upper body model is a recognition model which specifies the feature quantity of the shape of the upper body alone, learned from an image of the human upper body. The lower body model is a recognition model which specifies the feature quantity of the shape of the lower body alone, learned from an image of the human lower body. The color uniform model is a recognition model which specifies the feature quantity of the color uniformity, learned from an image of the shielding object having a high degree of color uniformity, such as a hood, a trunk of a vehicle.

(1) An input image supplied from the image input unit 2 is scanned using the upper body model (refer to FIG. 4a). Then, an upper body area of which the degree of agreement with the upper body model becomes beyond a specified value is detected in the input image and the detection position is listed.

(2) FIG. 4b illustrates an input image with schematically expressed frames each of which indicates the upper body area detected in (1). To the area corresponding to the lower body at the lower part of each upper body area detected in (1), the pattern recognition is performed using the lower body model and the color uniform model respectively, and it is determined whether the area matches with the lower body model and the color uniform model. FIG. 4c illustrates the case of recognition performed by applying the lower body model to the area at the part below the upper body model. FIG. 4d illustrates the case of recognition (determining of the degree of color uniformity) performed by applying the color uniform model to the area at the part below the upper body model.

(3) When the lower body area which matches one of the recognition models is detected as a result of the recognition in (2), an area combining the upper body area (the detection area by the upper body model) and the lower body area (the detection area by the lower body model or the color uniform model) is recognized to be a human, and the detection result is outputted (refer to FIG. 4e).

Effect of Second Embodiment

The area combining the upper body area detected using the recognition model for recognizing a specific area (the upper body) of the human body and the lower body area detected using the color uniform model to a specific area corresponding to the remaining body part (the lower body) other than the upper body area concerned is recognized to be a human. In this way, by taking the recognition result using the color uniform model into account, it is possible to furthermore improve the recognition rate to a human of which the lower body is hidden, compared with the recognition result by the pattern recognition of only the upper body. About the determining method of the degree of color uniformity in the lower body area, it is also preferable to calculate the degree of color uniformity from the image information instead of employing the color uniform model.

Third Embodiment

Figure 5:
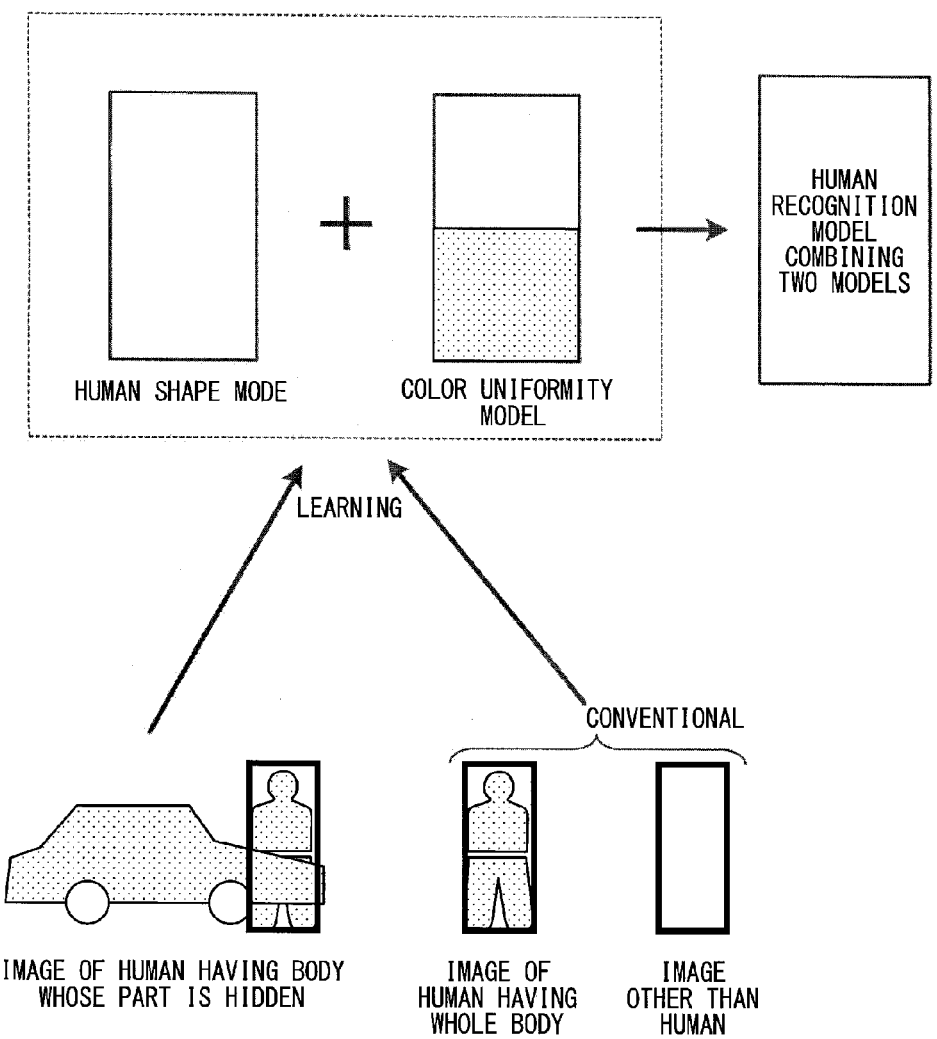
FIG. 5 is an explanatory diagram illustrating the outline of a third embodiment.

The human detecting method in a third embodiment performed by the control circuit 10 of the human detection apparatus 1 is explained with reference to FIG. 5.

(0) As premise of processing, the following human recognition model is created by learning and prepared in the storage portion 11: the human recognition model having the feature quantity of a human profile shape and the feature quantity of the color uniformity of an image recognized as a shielding object which hides a part of the human body. It can be said that the control circuit 10 functions as a human model creation section. This human recognition model is created by adding the color uniform model (color intensity and its position information are used) which describes the color uniformity of a shielding object, to the shape model which expresses a human profile shape, for example using the edge information of an image. The shape model is the same as the recognition model employed in the ordinary pattern recognition. The color uniform model specifies the feature quantity of the color uniformity about the area corresponding to the specific part (for example, the lower body) of the human body. It is also preferable that the color uniform model specifies the feature quantity of the color uniformity about the area corresponding to a part other than the human lower body. Learning of the human recognition model having the feature quantity of shape and color uniformity is performed by using a human image of which a part of the body (for example, the lower body) is hidden and a human image which is not hidden at all and an image other than a human, and by extracting the feature quantity of the human profile shape and the color uniformity of the shielding object.

(1) The human recognition is performed by scanning the input image supplied from the image input unit 2 with the human recognition model having the feature quantity of shape and color uniformity, and the detection result is outputted. Specifically, the degree of agreement with the human recognition model is determined at each position of the input image. Then, when a pedestrian's profile shape and the color uniformity which are expressed by the human recognition model match in a detection area, the detection area is recognized as "a human of which a part of the body is hidden", and the detection area is outputted.

Effect of Third Embodiment

With the use of a human image of which a part of the body is hidden and a human image which is not hidden at all, it is possible to learn and create the human recognition model combining the feature quantity of the profile shape of the image recognized as a human and the feature quantity of the color uniformity of the image recognized as a shielding object which hides the human body. The human recognition model learned in this way is improved more with respect to the description accuracy of information compared with the recognition model in the past. With the use of such a human recognition model, it is possible to improve the recognition rate to a human of which a part of the body is hidden, by combining the recognition on the basis of the feature quantity of shape and the recognition on the basis of the feature quantity of color uniformity.

While the present disclosure has been described with reference to embodiments thereof, it is to be understood that the disclosure is not limited to the embodiments and constructions. The present disclosure is intended to cover various modification and equivalent arrangements. In addition, while the various combinations and configurations, other combinations and configurations, including more, less or only a single element, are also within the spirit and scope of the present disclosure.

The invention claimed is:

1. A human detection apparatus to detect a human by pattern recognition from an input image picked up by an image pickup unit, the human detection apparatus comprising:
   a specification section to specify a candidate area from the input image using a recognition model to recognize a human, the candidate area being estimated as a human;
   a color determination section to determine a degree of color uniformity in the input image; and
   a human determination section to determine whether an image area including the candidate area is a human based on a positional relationship between the candidate area specified by the specification section and an image part, the image part providing the degree of color uniformity determined by the color determination section that satisfies a prescribed requirement.

2. The human detection apparatus according to claim 1, further comprising:
   a human recognition model including shape information and color uniformity information,
      the shape information specifying a feature quantity of a shape of an image recognized as a human,
      the color uniformity information specifying a feature quantity of color uniformity of an image recognized as a shielding object hiding a human body of a human,
   wherein the human determination section determines whether the candidate area is a human based on the candidate area specified using the shape information and a result from determining the degree of color uniformity in the candidate area using the color uniformity information.

3. The human detection apparatus according to claim 2, wherein the color uniformity information in the human recognition model specifies the feature quantity of color uniformity in an image of a shielding object that hides a specific partial area in the human body.

4. The human detection apparatus according to claim 2, further comprising:
   a human model creation section to create a human recognition model having both the shape information and the color uniformity information, using an image of a human that is not hidden by a shielding object, and an image of a human body having a part that is hidden by a shielding object,
   wherein a human is detected using the human recognition model created by the human model creation section.

5. The human detection apparatus according to claim 1, wherein:
   the specification section
      calculates a score that indicates a human likeness in the input image based on a degree of agreement of the input image with the recognition model, and
      specifies as the candidate area an area including a portion having the calculated score that is in a prescribed range;
   the color determination section determines the degree of color uniformity in an image of a specific area that has a specific positional relationship with the candidate area specified by the specification section;
   the human determination section obtains a sum total score by adding the score according to the degree of color uniformity in the specific area determined by the color determination section to the score of the candidate area; and
   when the sum total score is greater than a specified value, the human determination section determines that an area including the candidate area is a human.

6. The human detection apparatus according to claim 5, wherein:
   the candidate area is divided into an upper area and a lower area; and
   the specific area determined by the color determination section is the lower area of the candidate area.

7. The human detection apparatus according to claim 1, wherein:
   the specification section employs the recognition model to recognize a specific body part of a human body to specify from the input image a candidate area that is estimated as the specific body part of the human body;
   the color determination section determines the degree of color uniformity in a specific area that is estimated as a remaining body part of the human body other than the specific body part of the human body that is estimated as the candidate area; and
   when the degree of color uniformity in the specific area satisfies a prescribed requirement, the human determination section determines that an area including the candidate area and the specific area is a human.

* * * * *